(No Model.)
T. CREBBIN.
SAW SWAGING MACHINE.
No. 360,420. Patented Apr. 5, 1887.
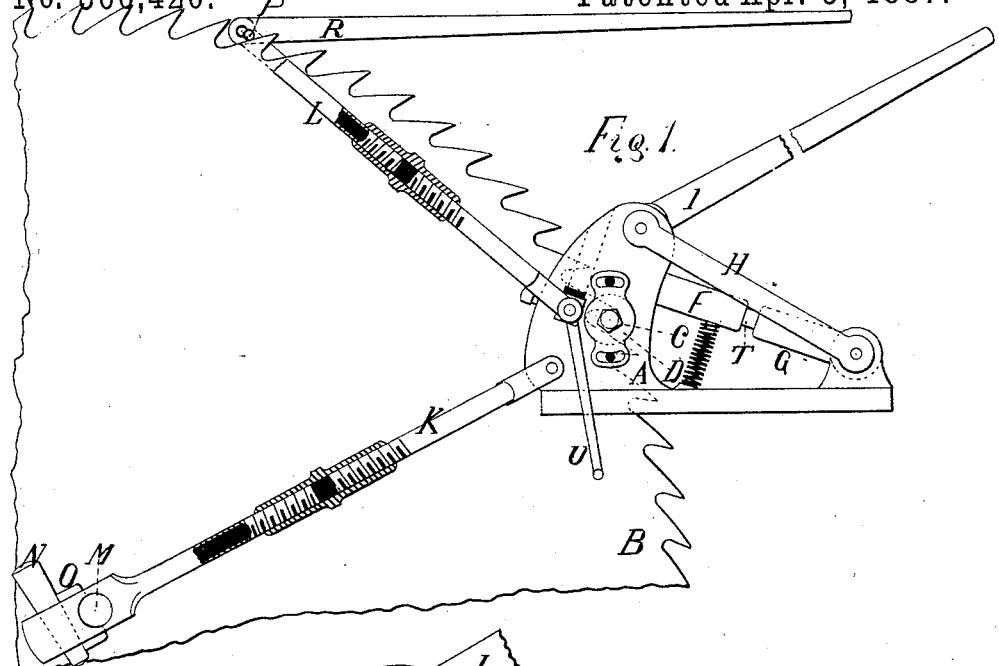
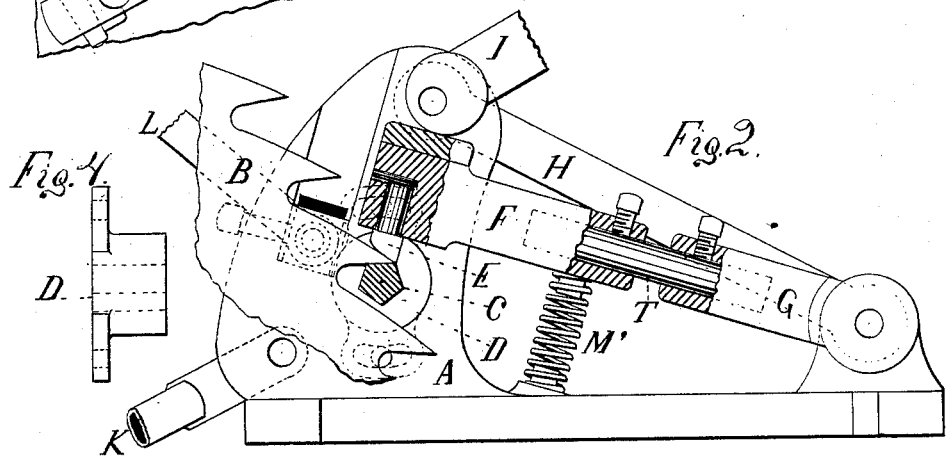
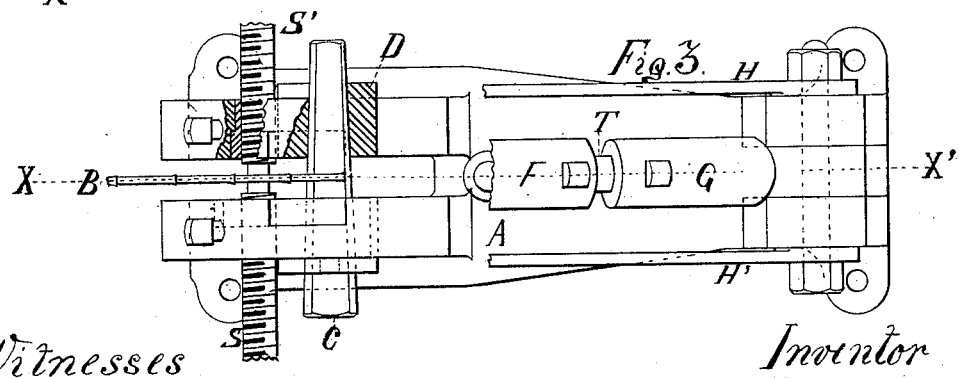
Witnesses
Edward B. Escott
T. Stevens
Inventor
Thomas Crebbin
By Edward Tagg
His Attorney

UNITED STATES PATENT OFFICE.

THOMAS CREBBIN, OF LUTHER, MICHIGAN.

SAW-SWAGING MACHINE.

SPECIFICATION forming part of Letters Patent No. 360,420, dated April 5, 1887.

Application filed July 26, 1886. Serial No. 209,767. (No model.)

*To all whom it may concern:*

Be it known that I, THOMAS CREBBIN, a citizen of the United States, residing at the village of Luther, in the county of Lake and State of Michigan, have invented a new and useful Machine for Swaging Mill-Saws, of which the following is a specification.

This invention relates to a machine consisting of a strong frame-work and suitable devices for holding the saw in position, so that each saw-tooth may be operated upon or swaged by means of pressure produced by means of a lever, as more fully described hereinafter; and the objects of my invention are, first, to enable the operator to swage the saw-teeth with great rapidity, and, second, to swage all the teeth uniformly, thereby producing the best possible results in preparing the saw for use. These objects I accomplish by means of the mechanism illustrated in the accompanying drawings, in which—

Figure 1 is a side elevation of the operating mechanism of my invention with the frame-work removed so as to show more clearly the position of the saw when being operated upon. Fig. 2 is a longitudinal sectional view of my invention on line X X of Fig. 3. Fig. 3 is a plan view of the complete machine. Fig. 4 is a detached sectional view of the adjustable plate, showing the position of the swage-iron resting therein.

Similar letters refer to similar parts throughout the several views.

A represents the frame-work of the machine, which is composed of iron or other suitable material.

B is a circular saw held in position to be operated upon.

C is the swage iron or anvil.

D is an adjustable plate, having an opening for the reception of the swage-iron. I use two of these plates, one at either side of the frame-work, and so attached as to be adjustable, in order to bring the swage-iron to the proper angle or position for the reception of the saw-tooth.

E is the swage-hammer.

F and G is an arm constructed in two parts so as to be adjusted longitudinally, which adjustment may be accomplished in any suitable manner. I have shown it adjustable by means of set-screws. The swage-hammer is supported in the arm F G, as shown in Fig. 2.

T is a rod or bar used in connection with the arm F G, for the purpose of giving the arm longitudinal adjustment.

I is an eccentric lever turning on a strong bolt, as shown.

M' is a coil-spring between the arm F G and the lower part of the frame-work, its function being to hold the end of the arm F G at all times in contact with the eccentric arm I.

H H are braces.

K is an arm, one end of which is attached to the frame-work of the machine by means of a bolt or pin, and the other end is attached to the arbor of the circular saw.

M is the saw-arbor.

O is a gib, and N is a key used to attach the arm K to the saw-arbor. The arm K is adjustable longitudinally, in order to adapt it to saws of different size. L is also an adjustable arm, attached at one end to the frame A. The other end of the arm L is attached to the lever R by means of the eccentric bolt P.

S and S' are screws supported by the frame A, one at either side, and are used to adjust and hold the saw in proper position.

U is a crank attached to the screw S.

The operation of my invention is as follows: The saw is placed within the frame, so that the saw-tooth rests upon the swage-iron, as shown in Fig. 2. The arm K is then adjusted to the saw-arbor so as to hold the saw in position. The eccentric bolt P is then placed upon the tooth, and the lever R pressed downward, which holds the saw-tooth firmly upon the swage-iron, the saw having been adjusted and clamped between the screws S and S'. The lever I is then lowered, which presses the swage-hammer upon the saw-tooth, flattening or swaging the saw-tooth into the required shape. This operation is applied to every tooth of the saw, when the work is complete.

Having thus described my invention, what I claim to have invented, and desire to secure by Letters Patent, is—

1. In a saw-swaging machine, the combination of an adjustable anvil or swage-iron for the reception of the saw-tooth, a hammer, an arm adapted to hold the hammer and to be adjusted longitudinally so as to bring the hammer to the required position with reference to the saw-tooth, an eccentric lever adapted to give the required pressure upon the hammer to form or swage the saw-tooth, substantially as described.

2. The combination, in a saw-swaging machine, of the frame of the machine, the swage-iron adapted to receive the tooth of the saw, an adjustable arm adapted to engage with the saw-arbor and hold the saw against the swage-iron, an adjustable arm provided with an eccentric bolt and a lever, said adjustable arm adapted to hold the bolt in position upon the upper side of the saw-tooth, and the lever adapted to turn the eccentric bolts so as to draw the periphery of the saw toward the swage-iron and hold the tooth firmly thereon, substantially as described.

3. In a saw-swaging machine, the combination of the frame adapted to receive the saw, the swage-iron supported in the adjustable plates D D, adapted to be adjusted to any required angle for the purpose of receiving the saw-tooth, substantially as described.

4. In a saw-swaging machine, a frame for receiving the saw, adjustable arms for holding the saw in position to bring the saw-tooth upon the swage-iron, and a swage-iron held in the frame and adapted to be adjusted to the position of each tooth to be operated upon without changing the position of the adjustable arm which holds the saw-arbor, substantially as described.

5. The adjustable arm F G, in combination with the hammer E, anvil C, eccentric lever I, and spring M', all constructed as described.

6. The following parts in combination, viz: the frame A, swage-iron C, eccentric lever I, arms L and K, eccentric bolt P, and lever R, all substantially as described.

7. The adjustable arm F G, in combination with the hammer E, anvil C, eccentric I, spring M', and screws S S, all substantially as described.

THOMAS CREBBIN.

Witnesses:
WILL E. L. SPRAGUE,
MAURICE A. REED.